F. W. MEYER.
PLOW ATTACHMENT.
APPLICATION FILED AUG. 3, 1906.
925,008.
Patented June 15, 1909.
2 SHEETS—SHEET 1.
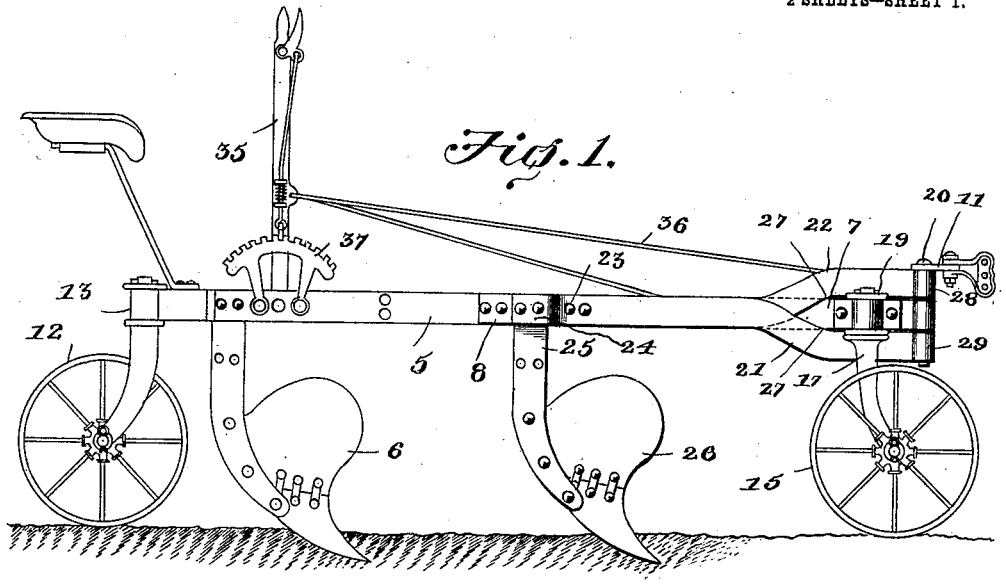
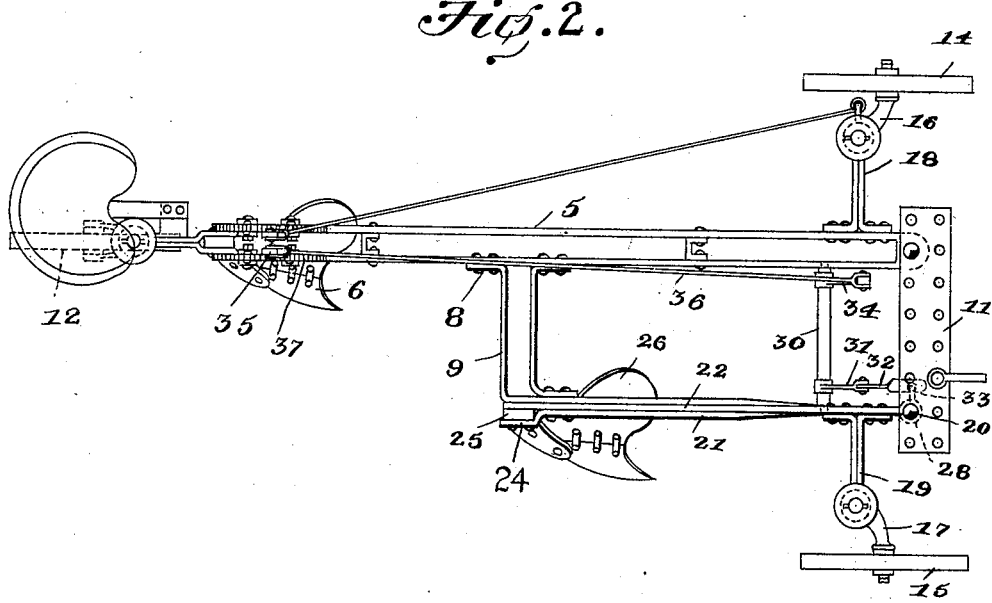
Witnesses
W. S. Rockwell
F. B. MacKat
Inventor
F. W. Meyer
By Chandler & Chandler
Attorney

F. W. MEYER.
PLOW ATTACHMENT.
APPLICATION FILED AUG. 3, 1906.

925,008.

Patented June 15, 1909.
2 SHEETS—SHEET 2.

Witnesses
W. S. Rockwell
F. B. MacNab

Inventor
F. W. Meyer
By
Attorney

UNITED STATES PATENT OFFICE.

FRED W. MEYER, OF BLOOMFIELD TOWNSHIP, WINNESHIEK COUNTY, IOWA.

PLOW ATTACHMENT.

No. 925,008.  Specification of Letters Patent.  Patented June 15, 1909.

Application filed August 3, 1906. Serial No. 329,071.

*To all whom it may concern:*

Be it known that I, FRED W. MEYER, a citizen of the United States, residing at Bloomfield township, in the county of Winneshiek, State of Iowa, have invented certain new and useful Improvements in Plow Attachments; and I do hereby declare the following to be a full, clear, and exact description of the invention, such as will enable others skilled in the art to which it appertains to make and use the same.

This invention relates to plows, and more particularly to gang plows, and has for its object to provide means whereby the front plow shovel may be swung to one side when turning a corner to cause the same to make a furrow.

A further object of the invention is to provide a construction of this nature, which will be durable and will strengthen instead of weakening the plow.

Figure 3:
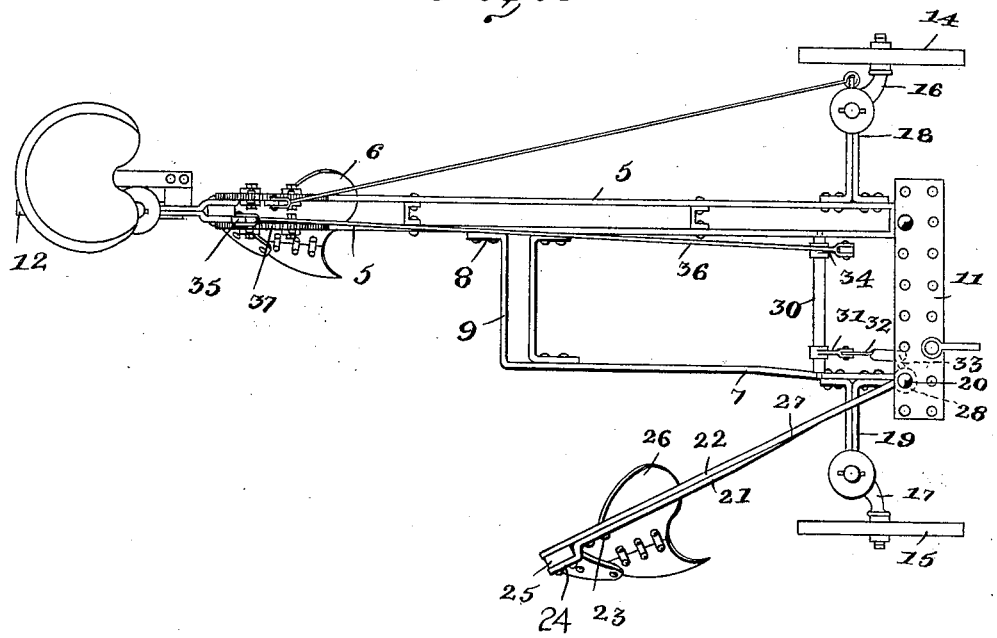
Figure 4:
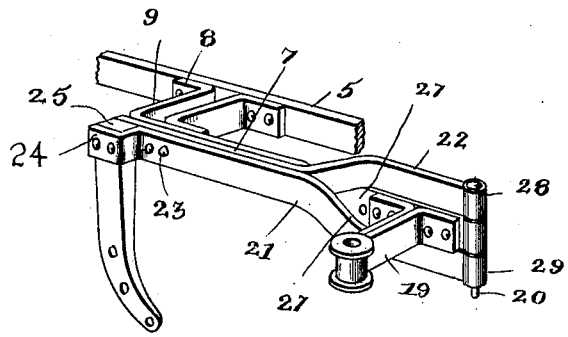

In the accompanying drawings:—Figure 1 is a side elevation of a gang plow, showing my invention. Fig. 2 is a top plan view thereof showing the forward plow in its normal position. Fig. 3 is a similar view showing it swung into position for turning a corner, and, Fig. 4 is a detail perspective view of the plow beams for the forward plow, and a portion of the frame.

Referring more specifically to the drawings, the numeral 5 denotes the beam for the rear plow, which is indicated by the numeral 6, and 7 a beam which forms a portion of the frame of the plow and is connected at its rear end, as at 8, to the beam 5 and extends laterally therefrom, as at 9, and thence forwardly, in spaced parallel relation to the beam 5, the said beams being connected at their forward ends by means of the usual clevis plate 11. The rear end of the plow is supported by means of a wheel 12, which is journaled at the lower end of a standard 13, carried by the beam 5 at its rear end, and the forward end of the plow is supported by means of similar wheels 14 and 15, which are carried by wheel-standards 16 and 17, respectively, the said wheel-standards being mounted in suitable laterally extending brackets 18 and 19 carried by the beams 5 and 7.

The beam 7 carries at its forward end a pintle 20, which extends above and below the said beam, as shown in Fig. 14, and this pintle serves as a means for mounting the beam for the forward plow for swinging movement in a horizontal plane, as will now be described. The said beam comprises a pair of bars 21 and 22, which are secured together adjacent their rear ends by means of bolts, or other suitable fastening devices 23. The bar 21 has its rear end bent outwardly and thence rearwardly, as at 24, in spaced relation to the corresponding end of the bar 22, and secured between the said ends of the bars is the upper end of the plow standard 25, for the forward plow 26. The bars 21 and 22, beyond their point of mutual connection, are turned respectively downwardly and upwardly, as at 27, and are thence directed forwardly in parallel relation and have their extreme forward ends bent to form eyes 28 and 29 for engagement with the pintle 20 above and below the beam 7.

In order that the beam for the forward plow may be swung to one side when turning a corner, I provide a rock-shaft 30, which is journaled at its ends in the beams 5 and 7, and is provided with a crank-arm 31, which latter is connected by means of a link 32 with an eye 33 formed on the forward end of the beam 7. A second crank-arm 34 is secured to the shaft and is directed upwardly therefrom, and connecting this arm and a lever 35 is a rod 36, the said lever being pivoted to the beam 5 adjacent its rear end, and being arranged to coöperate with a segmental rack 37, by means of which it may be held at various points of adjustment.

It will be readily understood from the foregoing that the rock-shaft 30 may be rocked by means of the lever 35 to swing the plow beam, for the forward plow, to any desired position.

What is claimed, is:—

The combination with one of the side bars of a cultivator or the like, of a bracket secured to the said side bar and extending in parallel relation with respect thereto, said bracket having a pintle lug formed at its free end, a frame comprising a pair of bars secured together for the greater portion of their length and thence turned upwardly and downwardly respectively and extended in parallel relation one above the other, the said bars having pintle lugs formed at their forward ends and arranged for the reception therebetween of the pintle lug at the end of the bracket, a plow standard carried by the frame, and a wheel standard carried by the bracket.

In testimony whereof, I affix my signature, in presence of two witnesses.

FRED W. MEYER.

Witnesses:
F. E. CRANDALL,
F. S. BURLING.